United States Patent
Zhou et al.

(10) Patent No.: US 12,045,595 B2
(45) Date of Patent: Jul. 23, 2024

(54) LOW-/NO-CODE PACKAGING OF APPLICATION BASED ON ARTIFACTS AND UNIVERSAL TAGS

(71) Applicant: SAP SE, Walldorf (DE)

(72) Inventors: Yi Quan Zhou, Singapore (SG); Qiu Shi Wang, Singapore (SG)

(73) Assignee: SAP SE, Walldorf (DE)

( * ) Notice: Subject to any disclaimer, the term of this patent is extended or adjusted under 35 U.S.C. 154(b) by 114 days.

(21) Appl. No.: 17/839,787

(22) Filed: Jun. 14, 2022

(65) Prior Publication Data
US 2023/0401046 A1    Dec. 14, 2023

(51) Int. Cl.
  *G06F 8/60*    (2018.01)
  *G06F 8/34*    (2018.01)
  *G06F 8/36*    (2018.01)

(52) U.S. Cl.
  CPC ............ *G06F 8/60* (2013.01); *G06F 8/34* (2013.01); *G06F 8/36* (2013.01)

(58) Field of Classification Search
  CPC ............ G06F 8/60; G06F 8/34; G06F 8/36
  See application file for complete search history.

(56) References Cited

U.S. PATENT DOCUMENTS

| | | | | |
|---|---|---|---|---|
| 7,685,596 B1* | 3/2010 | Webb | ............... | G06F 16/13 |
| | | | | 717/172 |
| 9,110,756 B1* | 8/2015 | Guo | ............... | G06F 8/65 |
| 9,952,835 B2* | 4/2018 | Wang | ............... | G06F 8/34 |
| 10,365,922 B1* | 7/2019 | Wang | ............... | G06F 21/57 |
| 10,521,196 B1 | 12/2019 | Wang et al. | | |
| 10,572,449 B2* | 2/2020 | Subramaniam | ............... | G06F 8/60 |
| 11,281,447 B2* | 3/2022 | Sn | ............... | G06F 11/3466 |
| 2015/0082298 A1* | 3/2015 | Wang | ............... | G06F 8/60 |
| | | | | 717/174 |
| 2016/0259804 A1* | 9/2016 | Subramaniam | ............... | H04L 67/34 |
| 2017/0220329 A1* | 8/2017 | Yang | ............... | G06F 8/60 |
| 2017/0242665 A1* | 8/2017 | Wang | ............... | G06F 8/71 |
| 2020/0380432 A1 | 12/2020 | Wang et al. | | |

(Continued)

OTHER PUBLICATIONS

Shatnawi, Anas, et al. "Analyzing program dependencies in java ee applications." 2017 IEEE/ACM 14th International Conference on Mining Software Repositories (MSR). IEEE, 2017. (Year: 2017).*

(Continued)

*Primary Examiner* — Matthew J Brophy
(74) *Attorney, Agent, or Firm* — Fish & Richardson P.C.

(57) ABSTRACT

Methods, systems, and computer-readable storage media for receiving, by an application studio, user input indicating two or more artifacts of an enterprise application developed using the application studio, generating, by an enterprise application artifact composer of the application studio, an enterprise application artifact as a universal tag that provides an abstract representation of the enterprise application, and during deployment of the enterprise application: retrieving the enterprise application artifact, determining a target runtime that the enterprise application is to be deployed to, determining a set of dependencies for each artifact of the enterprise application, and for any dependency in the set of dependencies that is absent from the target runtime, retrieving binary code of the dependency from a library to deploy the dependency to the target runtime.

20 Claims, 6 Drawing Sheets

(56) References Cited

U.S. PATENT DOCUMENTS

| | | |
|---|---|---|
| 2021/0030775 A1 | 2/2021 | Chen et al. |
| 2021/0064984 A1 | 3/2021 | Wang et al. |
| 2021/0191706 A1* | 6/2021 | Sn .................. G06F 11/3466 |
| 2022/0019932 A1 | 1/2022 | Wang et al. |

OTHER PUBLICATIONS

Shatnawi, Anas, et al. "Analyzing program dependencies in java ee applications." 2017 IEEE/ACM 14th International Conference on Mining Software Repositories (MSR). IEEE, 2017. (Year: 2017) (Year: 2017).*
U.S. Appl. No. 17/471,328, filed Sep. 10, 2021, Wang et al.
U.S. Appl. No. 17/646,890, filed Jan. 4, 2022, Wang et al.
U.S. Appl. No. 17/684,527, filed Mar. 2, 2022, Zang et al.

* cited by examiner

```
{
"schemaVersion": "1.0",
"id": "my-project",
"name": "My Project",
"description": "My long, long, long project description",
"version": "versionstring",
"type": "com.sap.project.bas",
"source": {
"git": {
"url": "https://github...",
"tag": "rel-0.0.1"
},
"archive": {
"url": "https://some/uri.path",
"contentId": "my-project-0.0.1"
}
},
"targets": {
"cloud": [{
"endpoint": "",
"org": "",
"space": ""
},
{
"endpoint": "",
"org": "",
"space": ""
}],

```
...
mobile": [{
"endpoint": "",
"org": "",
"space": "",
"appID": ""
},
{
"endpoint": "",
"org": "",
"space": "",
"appID": ""
}]
},
"artifacts": {
"com.sap.spa.automation": {
"my_automation": {
"name": "My Automation",
"description": "My long, long, long automation
description"
}
},
"com.sap.spa.process": {
"my_process": {
"name": "My Process",
"description": "My long, long, long process description"
}
},
"some_type": {
"some_type_instance": {}
}
},
"dependencies": {
"my-package1": "caretversionrange",
"my-package2": "caretversionrange"
}
}
```

FIG. 3B

LOW-/NO-CODE PACKAGING OF APPLICATION BASED ON ARTIFACTS AND UNIVERSAL TAGS

BACKGROUND

Software application development can be described in terms of a lifecycle that can include, for example, requirements, design, coding, testing, deployment, and maintenance. To deploy an application for productive use, the application is packaged in an application package (also referred to as installation package). Packaging of the application can be considered a relatively important aspect, because of its impact on whether the application can be successfully installed and deployed, as well as impacting the reusability and extensibility of the application.

In traditional approaches, packaging of an application can require the developer to spend a significant effort to maintain source files, handle various configuration management tasks, resolve component dependencies, and define how to compile, build, and install the application package. The detailed requirements of these tasks vary between different programming languages and development eco-systems. Consequently, traditional approaches require developers to have advance programming skills on complex development environments with specific technologies. Even for professional developers, such tasks can be challenging and tedious due to the variance in programming languages and development environments.

SUMMARY

Implementations of the present disclosure are directed to packaging of applications. More particularly, implementations of the present disclosure are directed to no-/low-code packaging of applications using artifacts and universal tags.

In some implementations, actions include receiving, by an application studio, user input indicating two or more artifacts of an enterprise application developed using the application studio, generating, by an enterprise application artifact composer of the application studio, an enterprise application artifact as a universal tag that provides an abstract representation of the enterprise application, and during deployment of the enterprise application: retrieving the enterprise application artifact, determining a target runtime that the enterprise application is to be deployed to, determining a set of dependencies for each artifact of the enterprise application, and for any dependency in the set of dependencies that is absent from the target runtime, retrieving binary code of the dependency from a library to deploy the dependency to the target runtime. Other implementations of this aspect include corresponding systems, apparatus, and computer programs, configured to perform the actions of the methods, encoded on computer storage devices.

These and other implementations can each optionally include one or more of the following features: the enterprise application artifact is generated by the enterprise application artifact composer in response to user input to the application studio indicating a release of the enterprise application; for at least one artifact of the two or more artifacts, the enterprise application artifact includes metadata indicating at least one dependency; each dependency in the set of dependencies comprises an artifact; each artifact of the two or more artifacts includes one of a service and a component; the enterprise application artifact includes metadata indicating a central repository that stores the enterprise application; and the target runtime includes one of a cloud runtime and a mobile runtime.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 3A and 3B depict an example universal tag in accordance with implementations of the present disclosure.

Like reference symbols in the various drawings indicate like elements.

DETAILED DESCRIPTION

Figure 1:
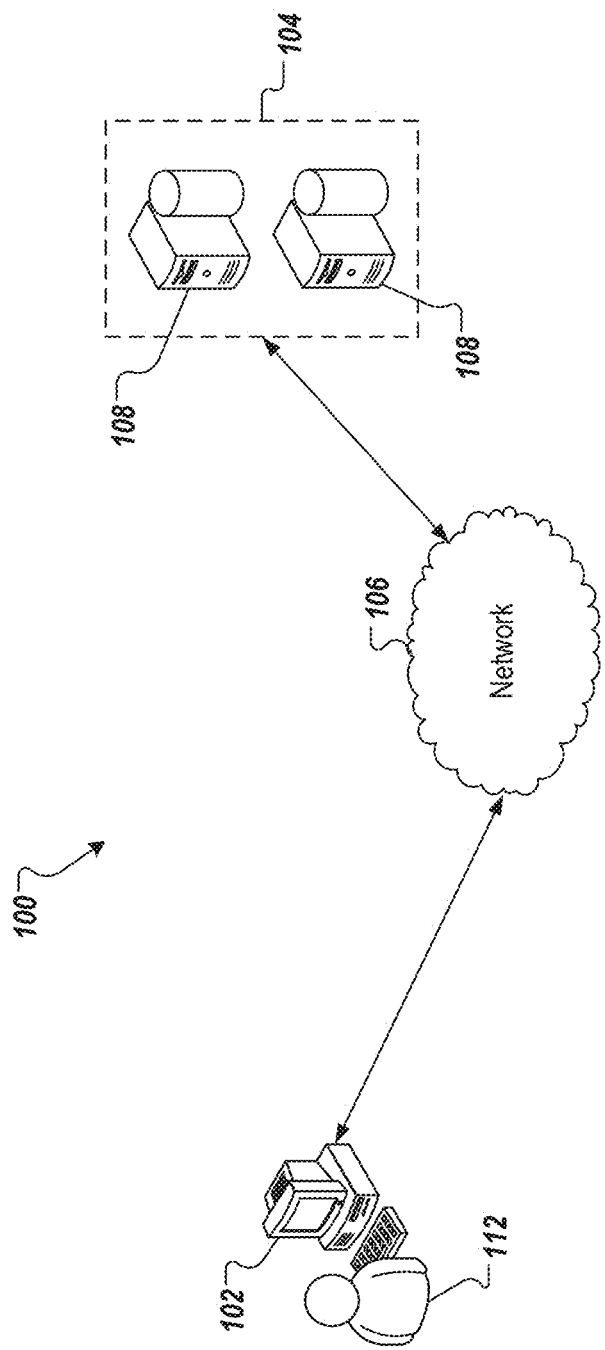
FIG. 1 depicts an example architecture that can be used to execute implementations of the present disclosure.

Implementations of the present disclosure are directed to packaging of applications. More particularly, implementations of the present disclosure are directed to a no-/low-code packaging of applications using artifacts and universal tags. In some implementations, actions include receiving, by an application studio, user input indicating two or more artifacts of an enterprise application developed using the application studio, generating, by an enterprise application artifact composer of the application studio, an enterprise application artifact as a universal tag that provides an abstract representation of the enterprise application, and during deployment of the enterprise application: retrieving the enterprise application artifact, determining a target runtime that the enterprise application is to be deployed to, determining a set of dependencies for each artifact of the enterprise application, and for any dependency in the set of dependencies that is absent from the target runtime, retrieving binary code of the dependency from a library to deploy the dependency to the target runtime.

As used herein, the terms low-code and no-code generally refer to software development platforms and/or tools that are targeted at users with little or no development experience (e.g., referred to as citizen developers, or low-code (no-code) developers). Another target of such platforms and/or tools can include more experienced developers having shorter timeframes for development (e.g., low-code (no-code) enabling developers to develop more quickly). Here, low-code can refer to development requiring some level of coding experience, while no-code can refer to development with no coding experience. In the context of implementations of the present disclosure, low-code (no-code) extension developers generally refers to developers of extensions to applications, who have limited development experience and/or are under tight timeframes to develop application extensions. While the present disclosure references low-code developers and/or no-code developers, it is appreciated that implementations of the present disclosure can be realized for the benefit of more sophisticated developers and/or developers having more generous timeframes to develop application extensions.

To provide further context for implementations of the present disclosure, and as introduced above, software application development can be described in terms of a lifecycle that can include, for example, requirements, design, coding, testing, deployment, and maintenance. Applications are typically composed of several artifacts, which can be provided in a hierarchical structure. In some instances, artifacts can be developed in disparate programming languages and/or disparate development environments.

To deploy an application for productive use, the application is packaged in an application package (also referred to as installation package). Packaging of the application can be considered a relatively important aspect, because of its impact on whether the application can be successfully installed and deployed in particular runtime environments, as well as impacting the reusability and extensibility of the application. In traditional approaches, packaging of an application can require the developer to spend a significant effort to maintain source files, handle various configuration management tasks, resolve component dependencies, and define how to compile, build, and install the application package. The detailed requirements of tasks for packaging an application vary between different programming languages and development environments. Consequently, traditional approaches require developers to have advance programming skills on complex development environments with specific technologies. Even for professional developers, such tasks can be challenging and tedious due to the variance in programming languages and development eco-systems.

With the evolution of enterprise digitalization, the demand of application development and deployment has expanded exponentially and continues to expand. The need for professional developers with broad skill sets in diverse development technologies presents a bottleneck in the development of enterprise applications.

In view of the above context, implementations of the present disclosure provide for a no-/low-code packaging of applications using artifacts and universal tags. As described in further detail herein, implementations of the present disclosure provide an application development platform that automatically provides application packages with artifacts, which are associated with a universal tag. Instead of packaging application with source code files and binary files, a new component, referred to herein as an enterprise application artifact, or enterprise artifact is introduced, which is described as a universal tag for a given project. The enterprise application artifact is self-explanatory, self-contained, self-provisioning and self-versioning, and is designed natively for multiple cloud environments. In some examples, the enterprise application artifact is oriented to a specific enterprise domain and is designed to perform specific functions within that domain. In some examples, the enterprise application artifact runs autonomously and contains its own data and logic. In some examples, the enterprise application artifact has a service application programming interface (API) to interoperate with other artifacts and has its own development lifecycle and versioning.

In some examples, an application package is a collection of artifacts of a project that is universally tagged to an enterprise application artifact. As described in further detail herein, the enterprise application artifact includes metadata that provides an abstract description of the underlying enterprise application (project). Artifacts that provide functionality of the enterprise application can include, for example and without limitation, services (sometimes referred to as microservices) and components (sub-application, independent program). For example, a service can include a back-end data service (e.g., open data protocol (OData) service) and a component can provide transaction and/or user interaction functionality (e.g., user interface (UI) functionality). To develop an enterprise application, low-code/no-code developers (or more experienced developers) can use the application development platform of the present disclosure to create a project to directly reuse and extend existing artifacts and/or develop new enterprise application artifacts. When packaging an enterprise application, a snapshot of all of the artifacts in the project will be taken and an enterprise application artifact (metadata) is created as a universal tag that abstractly represents the enterprise application in terms of the artifacts. Each universal tag (enterprise application artifact) is persistent to the resulting application package that is used to deploy the enterprise application to runtime environments.

Implementations of the present disclosure provide one or more advantages. For example, implementations of the present disclosure obviate the need for highly skilled developers to maintain and compile source code and/or build and install binary code. Instead, implementations of the present disclosure enable the complex and tedious source code level tasks to be automatically and transparently executed for no-code/low-code developers. Implementations of the present disclosure leverage a visual editor with easy-to-use user interface and user experience (UI/UX) to empower developers to configure and manage artifacts in a low-code/no-code approach. It is self-explanatory, self-contained, self-provisioning and self-versioning, designed natively for multi-cloud. It gives developer great freedom to reuse, extend, develop artifacts for specific business requirement. Further, implementations of the present disclosure provide automatic and transparent configuration management and version control. As described in further detail herein, packaging of the present disclosure creates universal tags onto artifacts and make them persistent to the packaged application. It creates a single source of truth of configuration management and version control of packaged application and ensures that the correct versions of artifacts are chosen and instantiated in runtime.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106). In some examples, the server system 104 can provision a cloud platform that hosts one or more cloud-based applications.

In accordance with implementations of the present disclosure, the server system 104 can host an application development platform that packages applications into application packages for deployment. As described in further detail herein, the application development platform provides an enterprise application artifact as a universal tag that is an abstract representation of a respective enterprise application.

Figure 2:
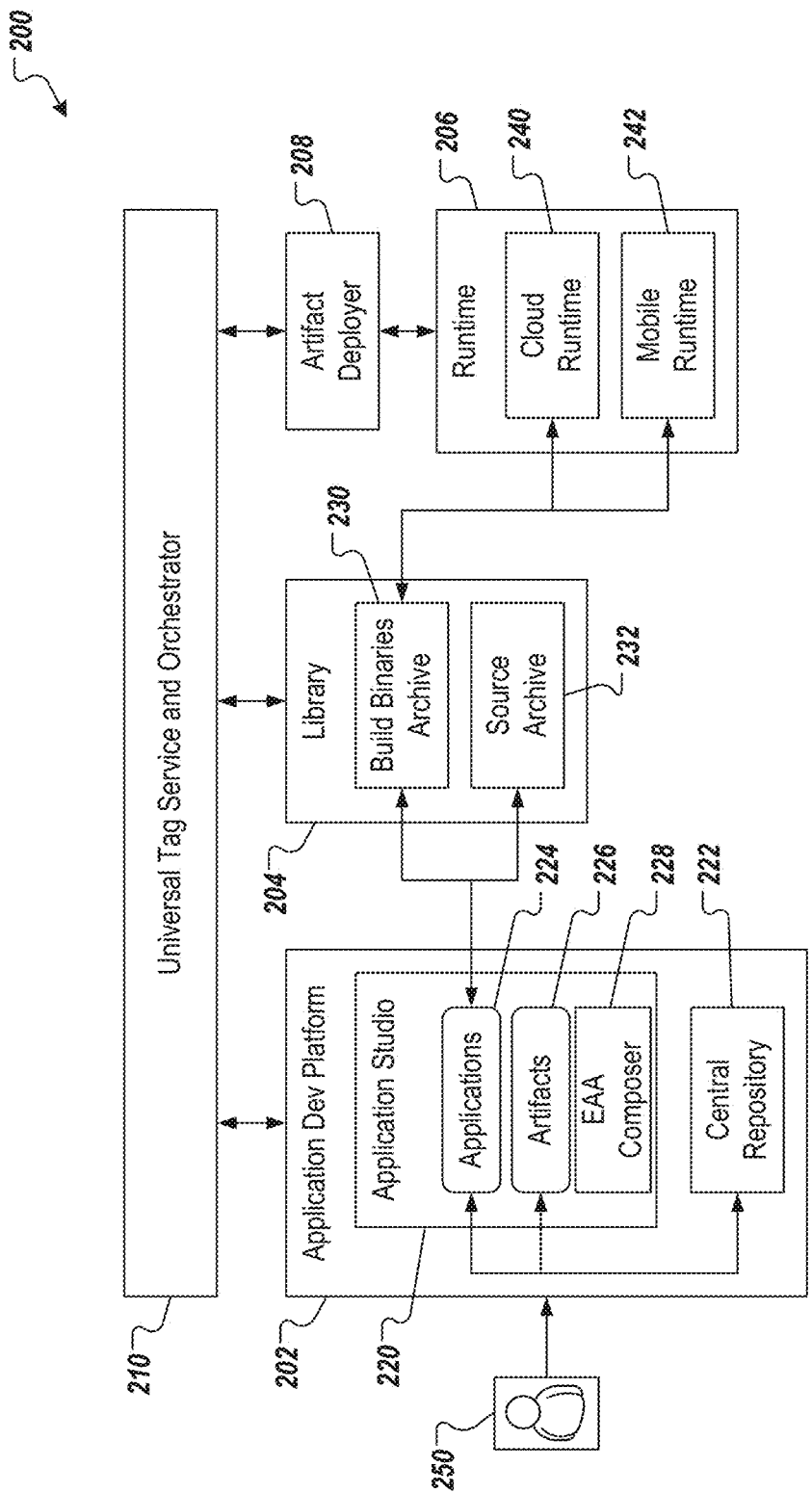
FIG. 2 depicts an example architecture in accordance with implementations of the present disclosure.

FIG. 2 depicts an example architecture 200 in accordance with implementations of the present disclosure. The example architecture 200 includes an application development platform 202, a library 204, a runtime environment 206, an artifact deployer 208, and a universal tag service and orchestrator 210. In the example of FIG. 2, the application development platform 202 includes an application studio 220 and a central repository 222 (e.g., a central github). The application studio enables development of enterprise application 224 and underlying artifacts 226, and includes an enterprise application artifact composer 228. The library 204 includes build binaries archive 230 and source archives 232 for deployment of enterprise applications. The runtime 206 includes a cloud runtime 240 and a mobile runtime 242. The runtime 206 is generically representative of runtime environments that enterprise applications can be deployed to including the cloud runtime 240 and the mobile runtime 242.

In accordance with implementations of the present disclosure, the enterprise application artifact composer 228 is operable in the development stage to provide an enterprise application artifact (universal tag) for an enterprise application that has been developed, the universal tag service and orchestrator is active in the packaging stage, and the artifact deployer 208 is operable in the runtime stage to deploy the enterprise application to the runtime 206.

In further detail, enterprise application artifact composer 228 is embedded into the application studio 220, which includes a full stack of tools for rapid enterprise application development. The enterprise application artifact composer 228 empowers low-code/no-code developers to compose their own enterprise application artifacts or reuse existing enterprise application artifacts. During development, a universal tag is automatically generated as an enterprise application artifact at each development milestone. The process of universal tag management is transparent to low-code/no-code developer, and frees up developers from tiresome tasks of source code level maintenance and control in the development stage.

In some examples, the enterprise application artifact orchestrator 228 automates the configuration management and version control tasks for building and packaging of the underlying enterprise application. For example, the enterprise application artifact orchestrator 228 automatically builds the source code into binaries (e.g., using the build binaries archive 230), archives the source code (e.g., to the source archive 232) and updates the enterprise application artifact with the related information for application packaging.

In further detail, during design-time, a developer 250 (e.g., low-/no-code developer) interacts with one or more editors of the application studio 220 to define an enterprise application. For example, the application studio 220 provides a wizard to guide the developer 250 through a guided development process. In some examples, the guided development process enables the developer 250 to select data models and services of the enterprise application, as well as define a set of UIs that enable users to execute workflow tasks during runtime. In some examples, the one or more editors provide a set of templates and the wizard that enables the developer 250 to create UIs for workflow tasks from the templates. In some examples, an editor enables the developer 250 to drag-and-drop UI controls into a UI, provide text labels for UI controls, and the like. Accordingly, and as described in further detail herein, the application studio 202 enables no code/low code development of enterprise applications. That is, the developer 210 can have little to no experience in software development, but still be able to design enterprise applications.

In some implementations, the enterprise application artifact (universal tag) is automatically generated when a release action of the project (development of the enterprise application) is triggered. In some examples, information, such as project name and description are retrieved from the project for population within the enterprise application artifact. Such information, for example, is originally input by the developer 250 in creating the project with the wizard. In some examples, a guided development tool of the enterprise application artifact composer 228 guides the developer 250 to further develop the enterprise application artifact and to connect the project to a remote git repository (e.g., the central repository 222). The information, such as location information of the repository (see example of FIG. 3A, below). The other information in universal tag, such as the artifact ID, version, type, and the like are generated and populated within the enterprise application artifact based on the project status and landscape, when the developer 250 triggers a release action after development is over and project is ready for release. Accordingly, a bulk of the enterprise application artifact (universal tag) is generated during a release process, and the content of the enterprise application artifact is a collection of artifact project information, which is generated at various development stages of project during project creation.

FIGS. 3A and 3B depict an example universal tag 300 in accordance with implementations of the present disclosure.

In the example of FIGS. 3A and 3B, a location of source code within a central repository (e.g., the central repository 222 of FIG. 2) is indicated by a uniform resource locator (URL) (e.g., "url": "https://github . . . ") and a respective release (e.g., "tag": "rel-0.0.1"). Further, a location of source code within an archive (e.g., the source archive 232 of FIG. 2) is indicated (e.g., "url": "https://some/uri.path", "contentId": "my-project-0.0.1"). In the example of FIGS. 3A and 3B, the universal tag 300 indicates runtime environments (e.g., the cloud runtime 240, the mobile runtime 242) that the enterprise application can be deployed to.

In accordance with implementations of the present disclosure, the universal tag 300 identifies artifacts that the enterprise application is made up of. That is, the universal tag 300 identifies artifacts that provide the functionality of the enterprise application. For example, in FIG. 3B, the universal tag 300 provides a list of example artifacts of an enterprise application (e.g., "com.sap.spa.automation", "com.sap.spa.process"). The universal tag 300 also provides dependencies.

Referring again to FIG. 2, during runtime of the enterprise application, the artifact deployer 208 automatically provisions required computing resources for execution of components of the enterprise application within the runtime 206. More particularly, the artifact deployer 208 retrieves the enterprise application artifact (universal tag) of the enterprise application and provisions resources within the runtime 206 based on the metadata. Deployment of the components is automatically adaptive to different runtime environments (e.g., iOS, Android mobile devices and different computer desktops and web browsers) to accommodate the multi-experience for end users from various touch points with form factors.

In further detail, the artifact deployer 208 can be described as an orchestration deployer that deploys each artifact (e.g., component, service) that makes up the enterprise application, as well as any dependent artifacts. In some examples, the artifact deployer 208 checks availabilities of dependencies ("dependencies" defined in universal tag) within a target runtime ("target" defined in universal tag). In some examples, a dependency is an artifact (e.g., component, service) that another artifact depends on (e.g., a data service can be a dependency, because another artifact can rely on the data service to interact with data stored in a database system). If a dependency is not already in the target runtime, the artifact deployer 208 redirects the process to a deployment process to deploy the dependency by retrieving any dependent artifacts (e.g., deploy an instance of the dependency within the target runtime). For example, the artifact deployer 208 retrieves the dependent artifacts from the source archive 232 and their respective binaries from the build binaries archive 230, and then deploys the binaries to the "target" runtime. When all dependencies are available, the artifact deployer 208 builds and generates binary of the artifact of current artifact project. The artifact deployer 208 deploys this binary to the respective runtime (e.g., cloud, mobile) according to the "target" defined in the universal tag.

Figure 4:
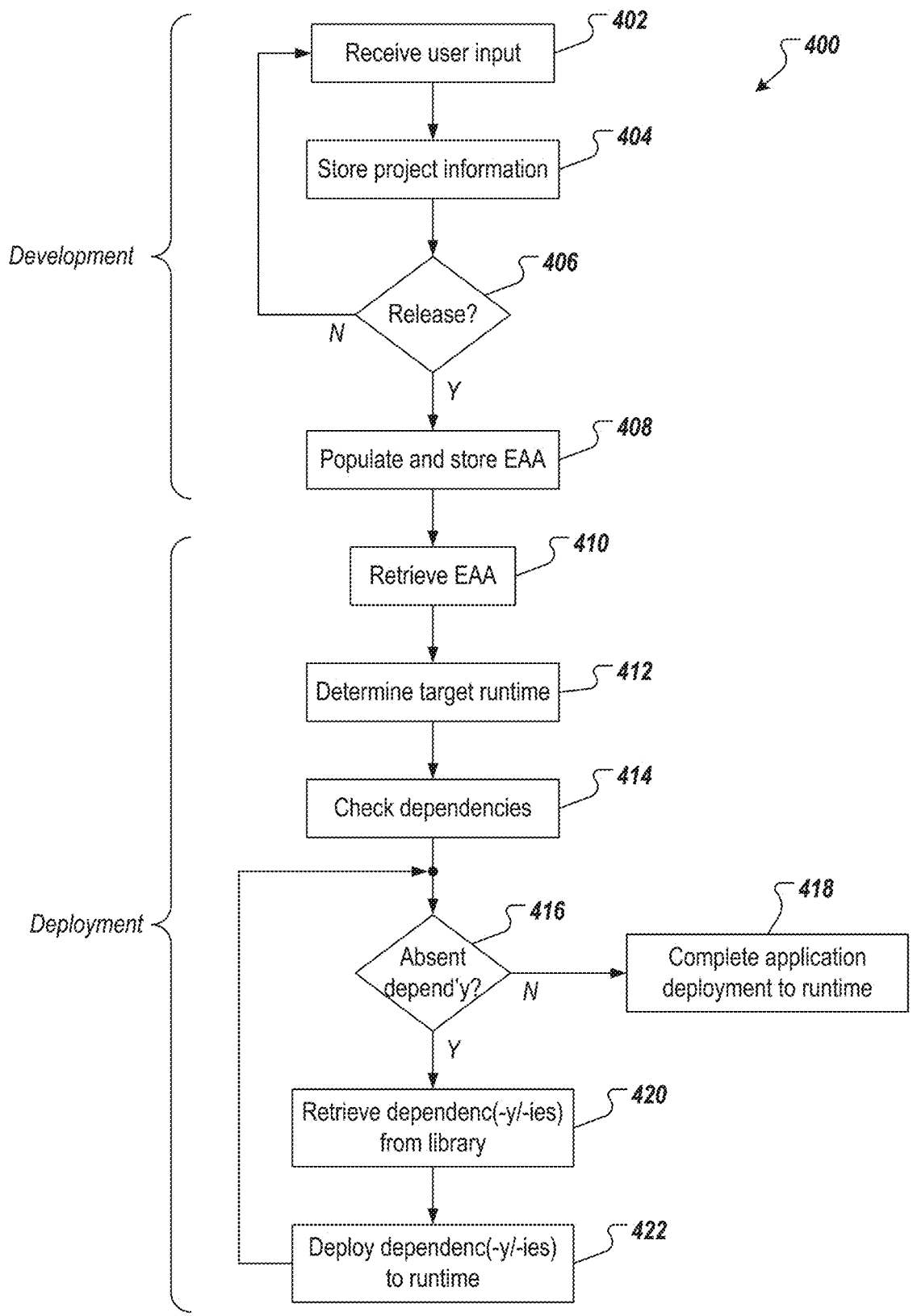
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

User input is received (402). For example, and as described herein, the developer 250 can provide input to the application studio 220 to create a project for an enterprise application. In some examples, user input can include a project name and a project description. In some examples, user input is provided through a guided application development process, during which the developer 250 can select data models, artifacts (e.g., services, components), and the like, which provide an infrastructure for the enterprise application. In some examples, user input can include textual input to provide text labels for UI elements, for example. Project information is stored (404). For example, and as described herein, user input representative of the project and the enterprise application is stored (e.g., the project name and project description are stored).

It is determined whether the project is to be released (406). For example, and as described herein, it can be determined whether the developer 250 has selected an option to release the enterprise application for production use. For example, the application studio 220 can provide a UI element that, if selected, indicates that the enterprise application is to be released. If the project is not to be released, the example process 400 loops back. If the project is to be released, the enterprise application artifact is populated and stored (408). For example, and as described herein, the enterprise application artifact composer 228 generates the enterprise application artifact (universal tag) during a release process. In some examples, the content of the enterprise application artifact is a collection of artifact project information, which is generated at various development stages of project during project creation. In this manner, the enterprise application artifact is a universal tag that provides an abstract representation of the enterprise application, as depicted by way of non-limiting example in FIGS. 3A and 3B.

An enterprise application artifact is retrieved (410). For example, and as described herein, during deployment of the enterprise application, the artifact deployer 208 retrieves the enterprise application artifact associated with the enterprise application. For example, a user can request deployment of the enterprise application, and, in response, the artifact deployer 208 can retrieve the enterprise application artifact for the enterprise application (e.g., based on identification number). A target runtime is determined (414). For example, and as described herein, the enterprise application artifact can indicate one or more target runtimes for the enterprise application, as depicted by way of non-limiting example in FIGS. 3A and 3B.

Dependencies are checked (414). For example, and as described herein, for one or more artifacts, the enterprise application artifact indicates dependencies that a respective artifact relies on. Accordingly, the artifact deployer 208 can determine dependencies from the enterprise application artifact. It is determined whether any dependency is absent from a target runtime (416). For example, and as described herein, for each dependency, it can be determined whether the dependency is deployed to the target runtime. For example, the artifact deployer 208 can reference a configuration file of the runtime, the configuration file indicating artifacts that are deployed to and executing within the target runtime. If a dependency is not indicated in the configuration file, it can be determined that the dependency is absent from the target runtime. If no dependencies are absent from the target runtime, application deployment to the target runtime is completed (418). For example, and as described herein, the enterprise application executes with all dependencies within the target runtime for production use of the application. If any dependency is absent from the target runtime, the dependenc(-y/-ies) is/are retrieved from a library (420) and the dependenc(-y/-ies) is/are deployed to the target runtime (422). For example, and as described herein, the artifact deployer 208 retrieves the dependent artifacts from the source archive 232 and their respective binaries from the build binaries archive 230, and deploys the binaries to the target runtime.

Figure 5:
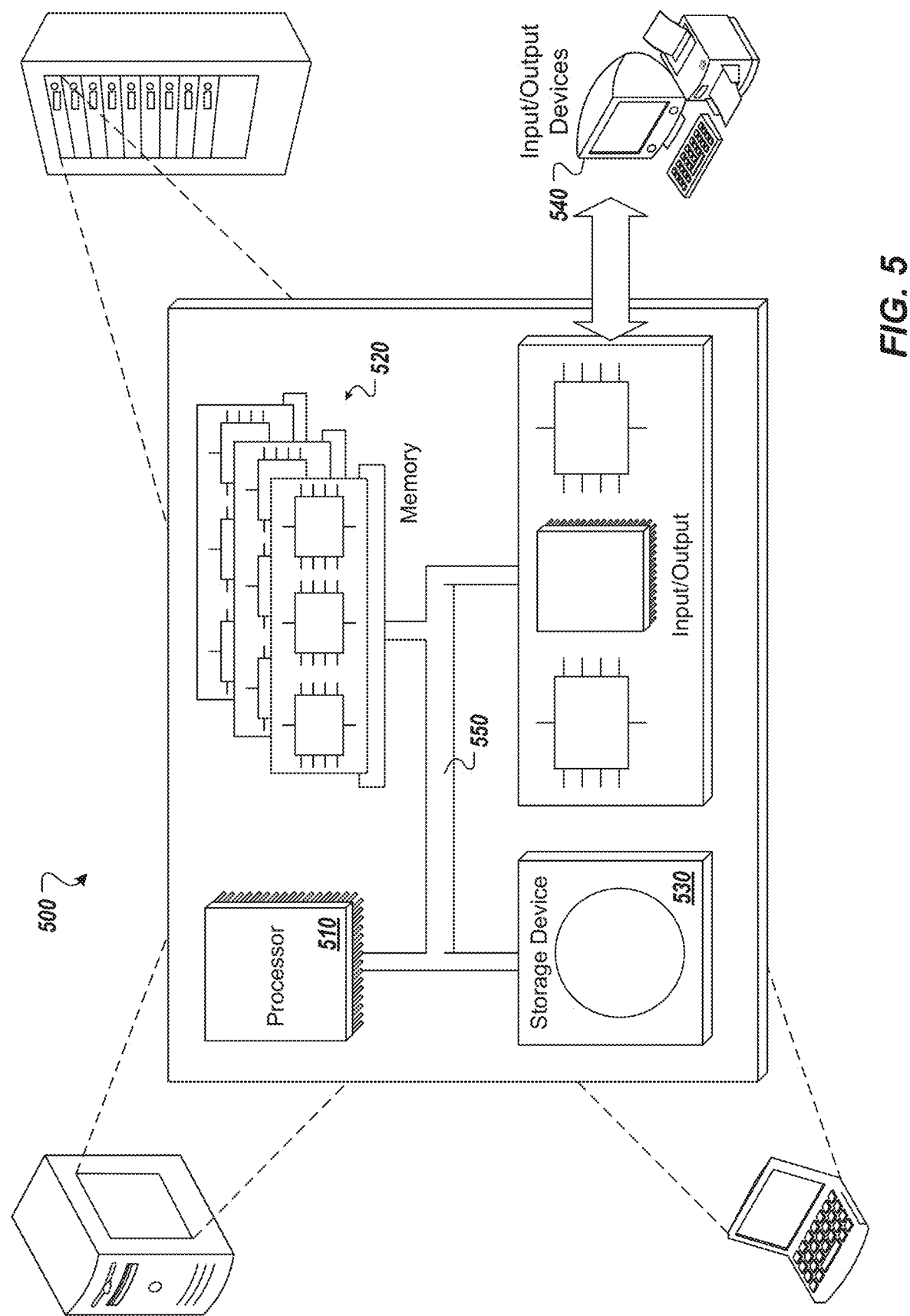
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for deploying enterprise applications to runtime environments, the method being executed by one or more processors and comprising:
receiving, by an application studio, user input indicating two or more artifacts of an enterprise application developed using the application studio;
generating, by an enterprise application artifact composer of the application studio, an enterprise application artifact as a universal tag that provides an abstract representation of the enterprise application; and
during deployment of the enterprise application:
retrieving the enterprise application artifact,
determining a target runtime that the enterprise application is to be deployed to, determining a set of dependencies for each artifact of the enterprise application, each dependency comprising an artifact that another artifact depends on for execution of the enterprise application in the target runtime, identifying a sub-set of dependencies comprising at least one dependency that is absent from the target runtime by referencing a configuration file of the target runtime, the configuration file indicating artifacts that are deployed to and executing within the target runtime, and for each dependency in the sub-set of dependencies, retrieving the dependency from a source archive and retrieving binary code of the dependency from a library to deploy the dependency to the target runtime.

2. The method of claim 1, wherein the enterprise application artifact is generated by the enterprise application artifact composer in response to user input to the application studio indicating a release of the enterprise application.

3. The method of claim 1, wherein, for at least one artifact of the two or more artifacts, the enterprise application artifact comprises metadata indicating at least one dependency.

4. The method of claim 1, wherein after each dependency in the sub-set of dependencies is deployed to the target runtime, a binary of the enterprise application artifact is provided and is deployed to the target runtime.

5. The method of claim 1, wherein each artifact of the two or more artifacts comprises one of a service and a component.

6. The method of claim 1, wherein the enterprise application artifact comprises metadata indicating a central repository that stores the enterprise application.

7. The method of claim 1, wherein the target runtime comprises one of a cloud runtime and a mobile runtime.

8. A non-transitory computer-readable storage medium coupled to one or more processors and having instructions stored thereon which, when executed by the one or more processors, cause the one or more processors to perform operations for deploying enterprise applications to runtime environments, the operations comprising:

receiving, by an application studio, user input indicating two or more artifacts of an enterprise application developed using the application studio;

generating, by an enterprise application artifact composer of the application studio, an enterprise application artifact as a universal tag that provides an abstract representation of the enterprise application; and during deployment of the enterprise application:

retrieving the enterprise application artifact, determining a target runtime that the enterprise application is to be deployed to, determining a set of dependencies for each artifact of the enterprise application, each dependency comprising an artifact that another artifact depends on for execution of the enterprise application in the target runtime, identifying a sub-set of dependencies comprising at least one dependency that is absent from the target runtime by referencing a configuration file of the target runtime, the configuration file indicating artifacts that are deployed to and executing within the target runtime, and for each dependency in the sub-set of dependencies, retrieving the dependency from a source archive and retrieving binary code of the dependency from a library to deploy the dependency to the target runtime.

9. The non-transitory computer-readable storage medium of claim 8, wherein the enterprise application artifact is generated by the enterprise application artifact composer in response to user input to the application studio indicating a release of the enterprise application.

10. The non-transitory computer-readable storage medium of claim 8, wherein, for at least one artifact of the two or more artifacts, the enterprise application artifact comprises metadata indicating at least one dependency.

11. The non-transitory computer-readable storage medium of claim 8, wherein after each dependency in the sub-set of dependencies is deployed to the target runtime, a binary of the enterprise application artifact is provided and is deployed to the target runtime.

12. The non-transitory computer-readable storage medium of claim 8, wherein each artifact of the two or more artifacts comprises one of a service and a component.

13. The non-transitory computer-readable storage medium of claim 8, wherein the enterprise application artifact comprises metadata indicating a central repository that stores the enterprise application.

14. The non-transitory computer-readable storage medium of claim 8, wherein the target runtime comprises one of a cloud runtime and a mobile runtime.

15. A system, comprising:

a computing device; and a computer-readable storage device coupled to the computing device and having instructions stored thereon which, when executed by the computing device, cause the computing device to perform operations for deploying enterprise applications to runtime environments, the operations comprising:

during deployment of an enterprise application:

retrieving an enterprise application artifact as a universal tag that provides an abstract representation of the enterprise application, the enterprise application artifact being generated by an enterprise application artifact composer of an application studio that, during development, receives user input indicating two or more artifacts of the enterprise application developed using the application studio, determining a target runtime that the enterprise application is to be deployed to, determining a set of dependencies for each artifact of the enterprise application, each dependency comprising an artifact that another artifact depends on for execution of the enterprise application in the target runtime, identifying a sub-set of dependencies comprising at least one dependency that is absent from the target runtime by referencing a configuration file of the target runtime, the configuration file indicating artifacts that are deployed to and executing within the target runtime, and for each dependency in the sub-set of dependencies, retrieving the dependency from a source archive and retrieving binary code of the dependency from a library to deploy the dependency to the target runtime.

16. The system of claim 15, wherein the enterprise application artifact is generated by the enterprise application artifact composer in response to user input to the application studio indicating a release of the enterprise application.

17. The system of claim 15, wherein, for at least one artifact of the two or more artifacts, the enterprise application artifact comprises metadata indicating at least one dependency.

18. The system of claim 15, wherein after each dependency in the sub-set of dependencies is deployed to the target runtime, a binary of the enterprise application artifact is provided and is deployed to the target runtime.

19. The system of claim 15, wherein each artifact of the two or more artifacts comprises one of a service and a component.

20. The system of claim 15, wherein the enterprise application artifact comprises metadata indicating a central repository that stores the enterprise application.

\* \* \* \* \*